United States Patent
Tsuji

(10) Patent No.: US 11,550,525 B2
(45) Date of Patent: Jan. 10, 2023

(54) NON-TRANSITORY COMPUTER-READABLE MEDIUM STORING COMPUTER-READABLE INSTRUCTIONS FOR TERMINAL DEVICE TO SEND CONNECTION INFORMATION TO COMMUNICATION DEVICE, AND COMMUNICATION DEVICE

(71) Applicant: BROTHER KOGYO KABUSHIKI KAISHA, Nagoya (JP)

(72) Inventor: Ryoya Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/325,313

(22) Filed: May 20, 2021

(65) Prior Publication Data

US 2021/0365225 A1 Nov. 25, 2021

(30) Foreign Application Priority Data

May 22, 2020 (JP) .............................. JP2020-089952

(51) Int. Cl.
*G06F 3/12* (2006.01)
*H04L 9/30* (2006.01)
(Continued)

(52) U.S. Cl.
CPC .......... *G06F 3/1292* (2013.01); *G06F 3/1222* (2013.01); *G06F 3/1236* (2013.01);
(Continued)

(58) Field of Classification Search
CPC .... G06F 3/1292; G06F 3/1222; G06F 3/1236; H04L 9/30; H04W 84/12; H04W 88/08
(Continued)

(56) References Cited

U.S. PATENT DOCUMENTS 9,967,741 B2 * 5/2018 Su ........................ H04W 12/06
2014/0368878 A1 * 12/2014 Asai .................. H04N 1/00408
358/1.15

(Continued)

FOREIGN PATENT DOCUMENTS

JP 2019-180041 A 10/2019

OTHER PUBLICATIONS

Device Provisioning Protocol Specification Version 1.1.13 created by the Wi-Fi Alliance.

*Primary Examiner* — Allen H Nguyen
(74) *Attorney, Agent, or Firm* — Scully, Scott, Murphy & Presser, PC

(57) ABSTRACT

A terminal device may execute a first attempt process in which the terminal device attempts to communicate with a server on the Internet via a communication interface by using a specific LAN to which the terminal device is currently connected; and in a case where the attempt to communicate with the server is successful in the first attempt process, send connection information to a communication device different from the terminal device, the connection information being for connecting the communication device to the specific LAN, wherein in a case where a specific condition is fulfilled, the connection information is not sent to the communication device, the specific condition including a condition that the attempt to communicate with the server fails in the first attempt process.

25 Claims, 8 Drawing Sheets

(51) Int. Cl.
*H04W 84/12* (2009.01)
*H04W 88/08* (2009.01)

(52) U.S. Cl.
CPC .............. *H04L 9/30* (2013.01); *H04W 84/12* (2013.01); *H04W 88/08* (2013.01)

(58) Field of Classification Search
USPC ...................................................... 358/1.15
See application file for complete search history.

(56) References Cited

U.S. PATENT DOCUMENTS

2015/0205548 A1* 7/2015 Suzuki .................. G06F 3/1288
358/1.14
2019/0303071 A1 10/2019 Tsuji
2020/0192616 A1 6/2020 Tsuji

* cited by examiner

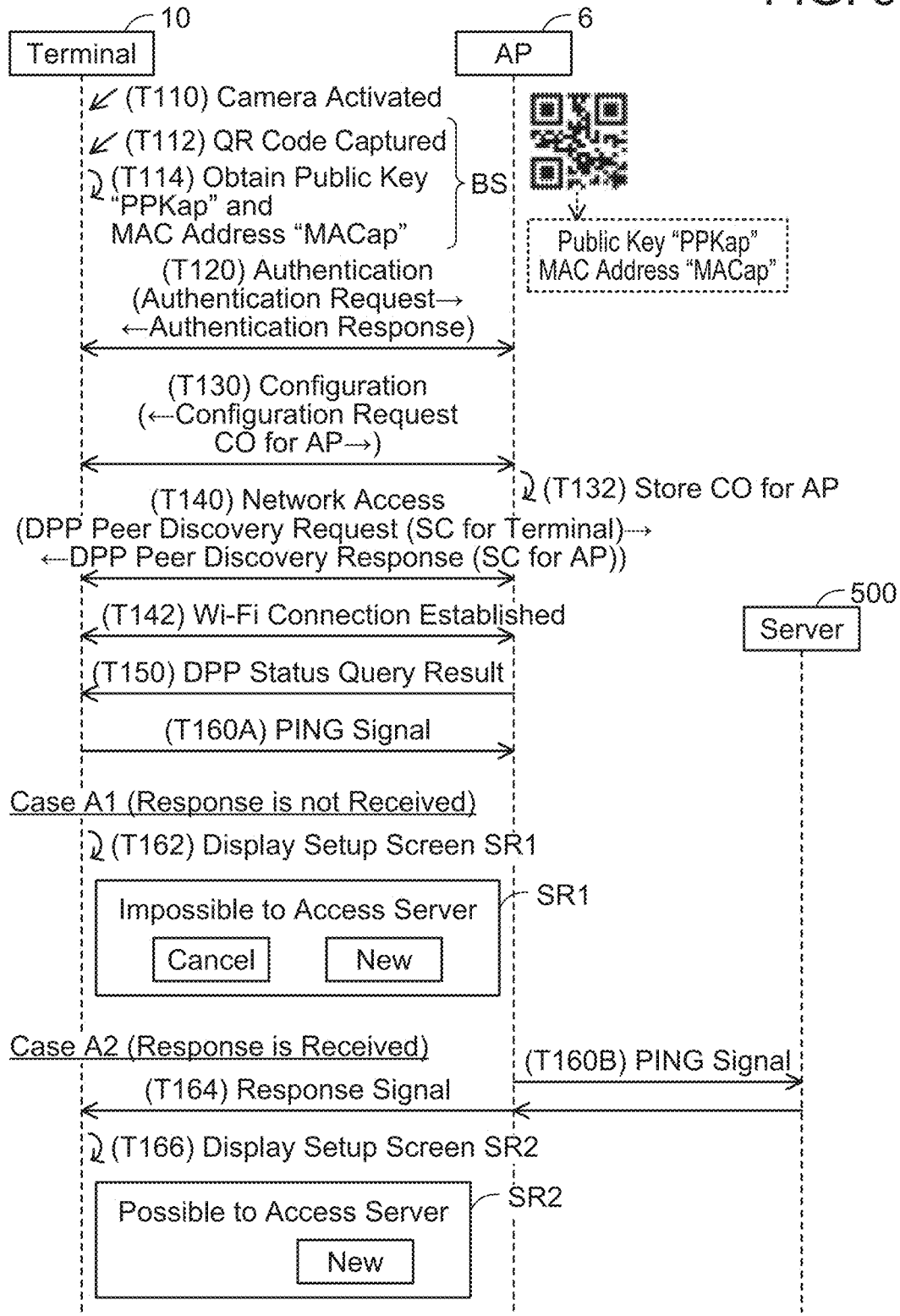

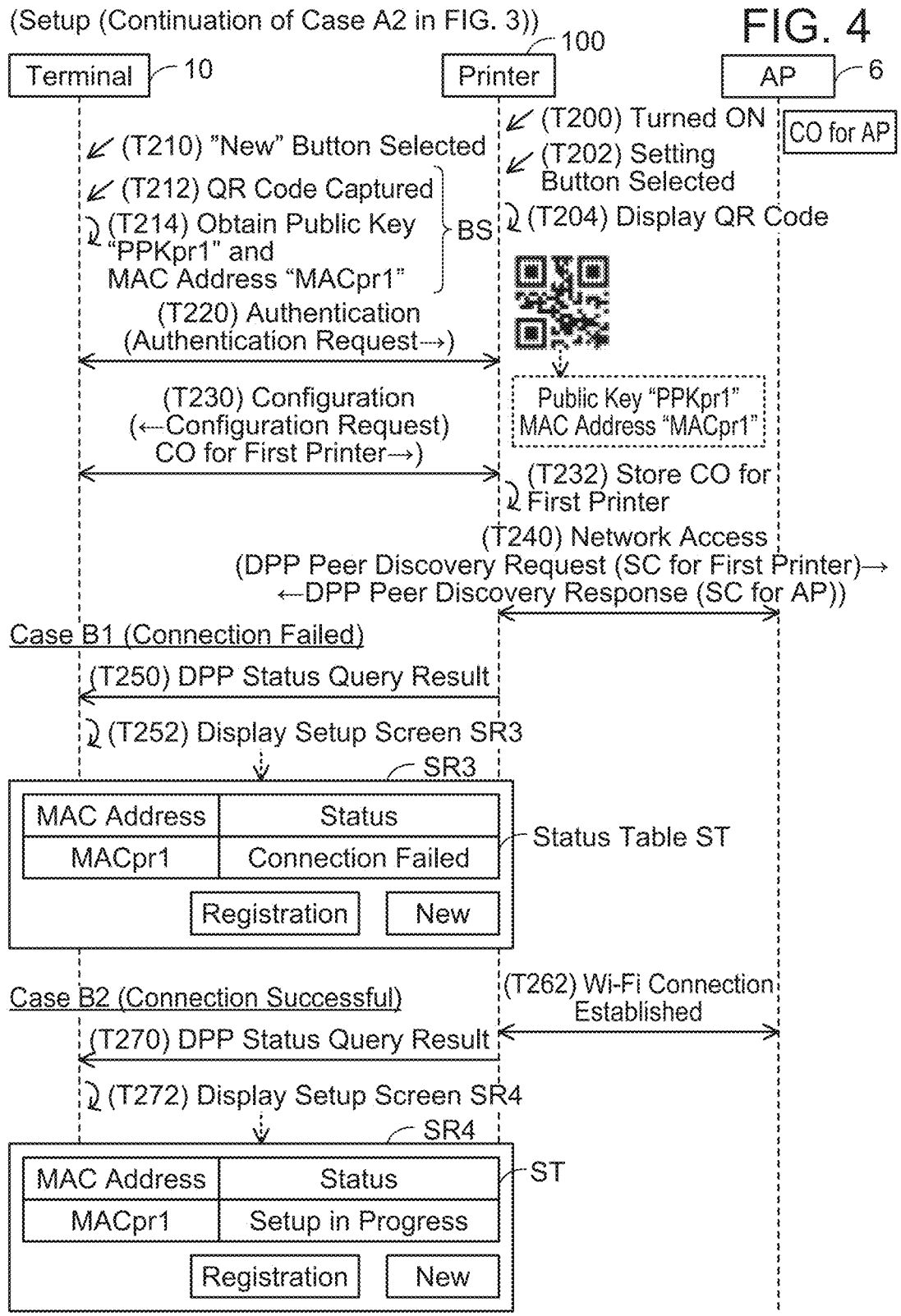

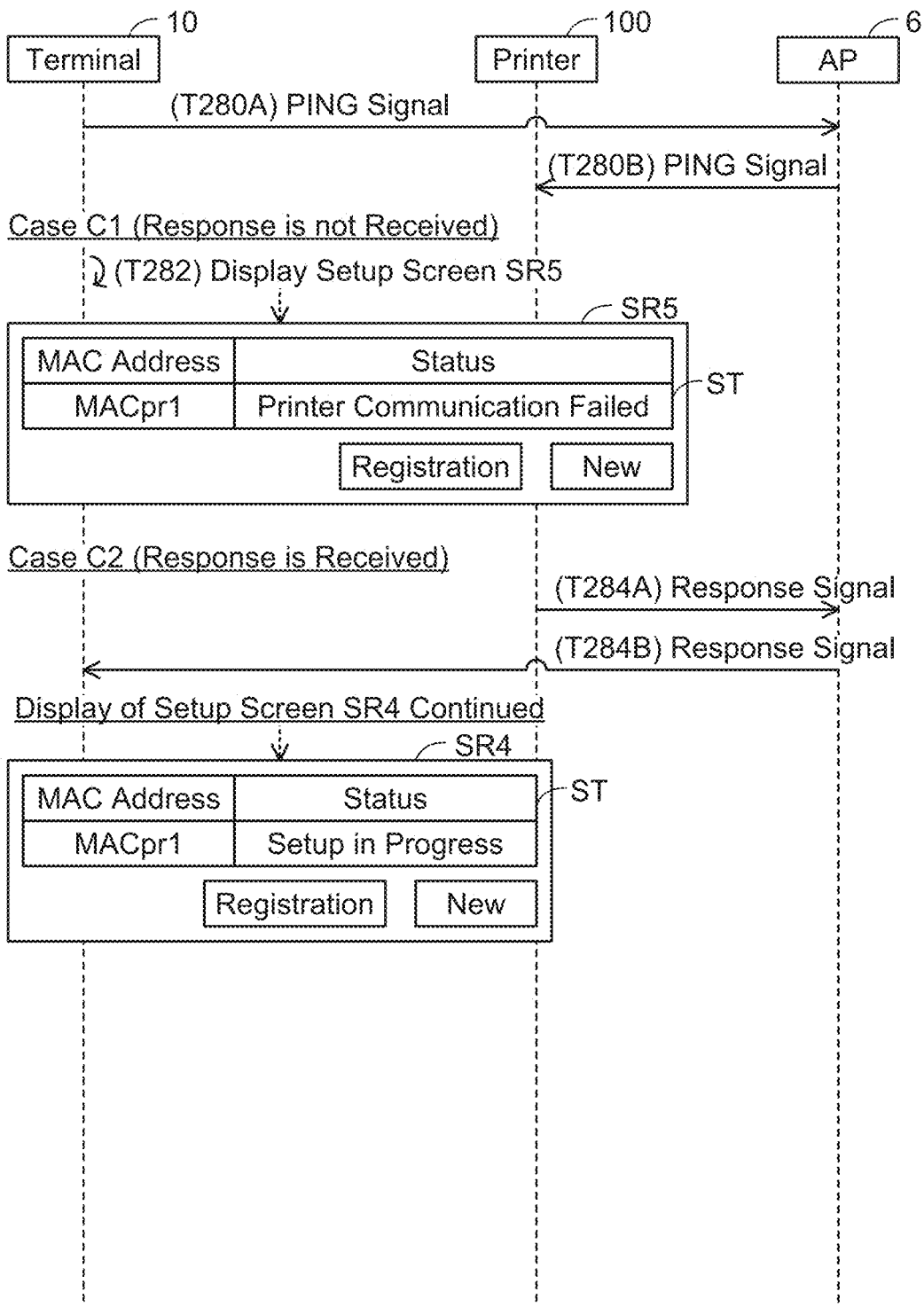

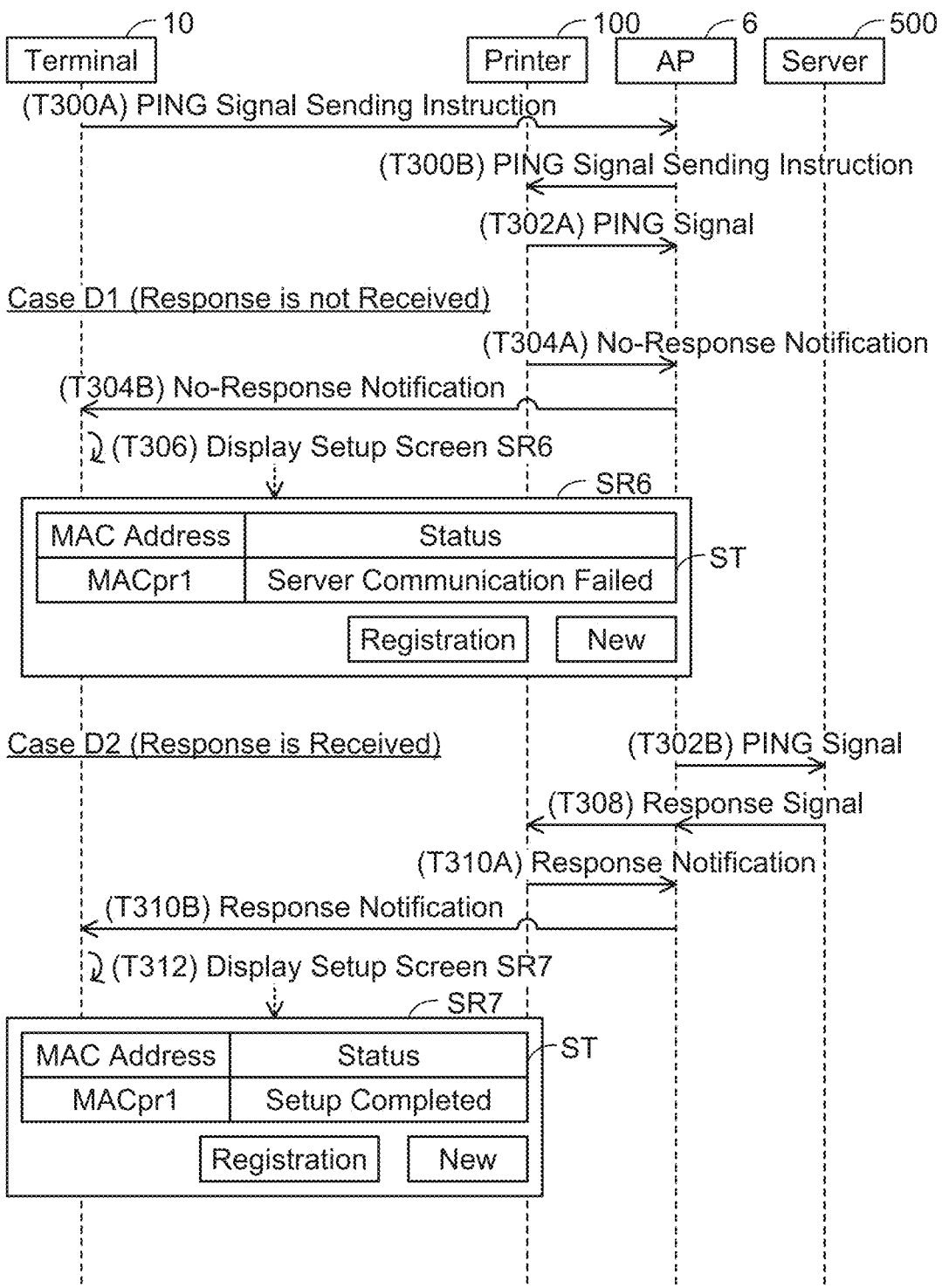

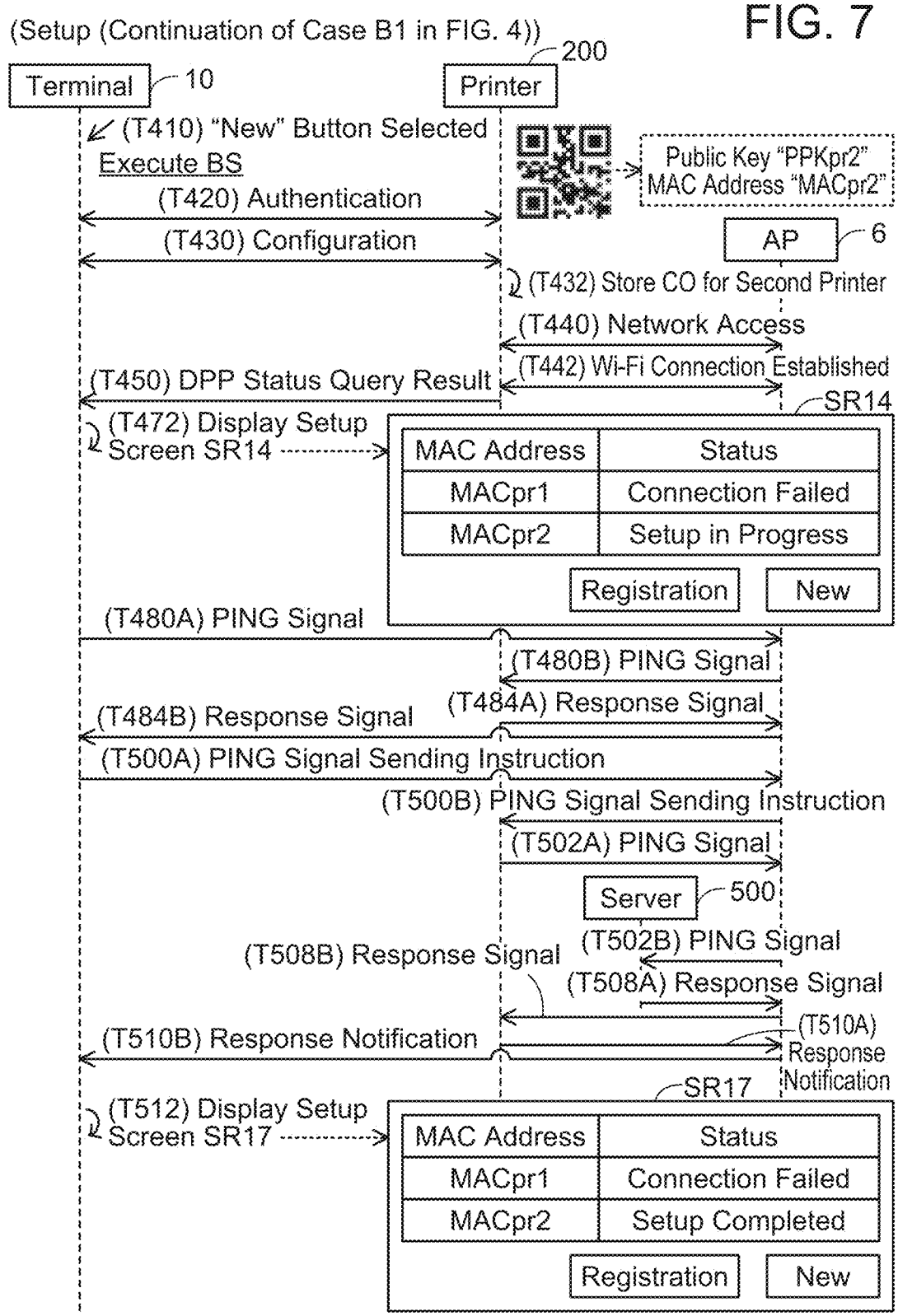

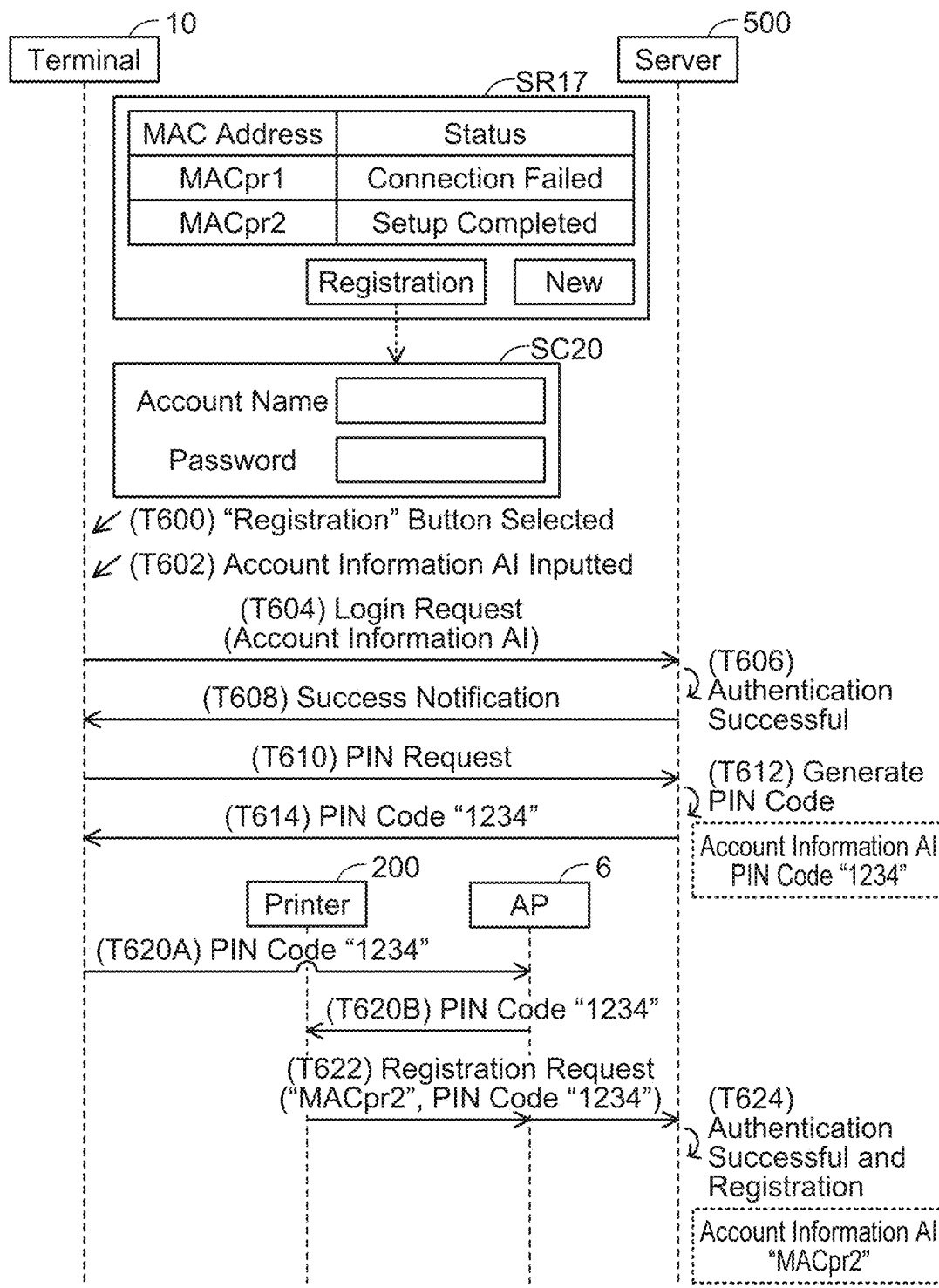

NON-TRANSITORY COMPUTER-READABLE MEDIUM STORING COMPUTER-READABLE INSTRUCTIONS FOR TERMINAL DEVICE TO SEND CONNECTION INFORMATION TO COMMUNICATION DEVICE, AND COMMUNICATION DEVICE

CROSS-REFERENCE TO RELATED APPLICATION

This application claims priority to Japanese Patent Application No. 2020-089952 filed on May 22, 2020, the contents of which are hereby incorporated by reference into the present application.

TECHNICAL FIELD

The disclosure herein relates to a technique for connecting a communication device to a Local Area Network (LAN) by using a terminal device.

DESCRIPTION OF RELATED ART

A terminal device that sends a Configuration Object for printer according to a Device Provisioning Protocol (DPP) scheme to a printer is known. The printer establishes a Wi-Fi connection with an access point by using the Configuration Object for printer. Then, the terminal device sends print data to the printer via the access point by using the Wi-Fi connection.

SUMMARY

The above technique does not give any consideration to the printer communicating with a server on the Internet.

The disclosure herein provides a technique that can allow a communication device to communicate with a server on the Internet.

The disclosure herein discloses a non-transitory computer-readable medium storing computer-readable instructions for a terminal device. The terminal device may comprise: a communication interface configured to execute communication using a Local Area Network (LAN); and a processor. The computer-readable instructions, when executed by the processor, may cause the terminal device to: execute a first attempt process in which the terminal device attempts to communicate with a server on the Internet via the communication interface by using a specific LAN to which the terminal device is currently connected; and in a case where the attempt to communicate with the server is successful in the first attempt process, send connection information to a communication device different from the terminal device, the connection information being for connecting the communication device to the specific LAN, wherein in a case where a specific condition is fulfilled, the connection information is not sent to the communication device, the specific condition including a condition that the attempt to communicate with the server fails in the first attempt process.

The disclosure herein discloses another non-transitory computer-readable medium storing computer-readable instructions for a terminal device. The terminal device may comprise: a communication interface configured to execute communication using a Local Area Network (LAN); and a processor. The computer-readable instructions, when executed by the processor, may cause the terminal device to: send connection information to a communication device different from the terminal device via the communication interface, the connection information being for connecting the communication device to a specific LAN to which the terminal device is currently connected; after the connection information has been sent to the communication device, send an attempt request to the communication device via the communication interface, the attempt request being for causing the communication device to attempt to communicate with a server on the Internet by using the specific LAN, wherein an attempt result in response to the attempt request is outputted by a predetermined output unit.

The disclosure herein also discloses a communication device. The communication device may comprise: a communication interface configured to execute communication using a Local Area Network (LAN); a processor; and a memory storing computer-readable instructions therein. The computer-readable instructions, when executed by the processor, may cause the communication device to: receive connection information from a terminal device different from the communication device via the communication interface, the connection information being for connecting the communication device to a specific LAN to which the terminal device is currently connected; connect the communication interface to the specific LAN by using the received connection information; after the connection information has been received from the terminal device, receive an attempt request from the terminal device via the communication interface, the attempt request being for causing the communication device to attempt to communicate with a server on the Internet by using the specific LAN; after the attempt request has been received from the terminal device, attempt to communicate with the server via the communication interface by using the specific LAN; and cause an output unit of the communication device to output result information indicating an attempt result in response to the attempt request.

The terminal device itself, and a method implemented by the terminal device are also novel and useful. A computer program for the above communication device, a non-transitory computer-readable medium storing the computer program, and a method implemented by the communication device are also novel and useful. Further, a communication system comprising the terminal device and the communication device is also novel and useful.

BRIEF DESCRIPTION OF THE DRAWINGS

FIG. 3 shows a sequence diagram of a setup process for an access point;

FIG. 4 shows a sequence diagram of a setup process for the printer;

FIG. 5 shows a continued sequence diagram of a case where a Wi-Fi connection has been established in FIG. 4;

FIG. 6 shows a continued sequence diagram from FIG. 5;

FIG. 7 shows a sequence diagram of a setup process for a second printer; and FIG. 8 shows a sequence diagram of a registration process to a server.

EMBODIMENTS (Configuration of Communication System 2; FIG. 1)

As shown in FIG. 1, a communication system 2 includes an access point (AP) 6, a terminal 10, and two printers 100, 200. The AP 6 is able to form a wireless LAN (Local Area Network) and relays, when connected to the Internet 8, communication between a device (e.g., the terminal 10) in the wireless LAN and a device (e.g., a server 500) on the Internet 8. When connected to the wireless LAN, the devices 10, 100, and 200 can communicate with the server 500 via the AP 6 and the Internet 8. The server 500 is set up on the Internet 8 by a vendor of the printers (e.g., 100). In a variant, the server 500 may be set up on the Internet 8 by a business entity different from the vendor of the printers (e.g., 100).

The server 500 is configured to provide a printer-related service to users of printers. This service includes, for example, a management service of receiving, from a printer, information indicating a state of the printer (e.g., a remaining amount of color material used in the printer) and managing the information. The management service is, for example, a service of shipping a cartridge containing the color material to the user of the printer when the present remaining amount of color material becomes equal to or less than a predetermined threshold.

The present embodiment assumes that the AP 6 and the printers 100, 200 are in an office. In order to receive the service provided by the server 500, an administrator of the office uses the terminal 10 to establish a wireless connection according to a Wi-Fi scheme (which will be called "Wi-Fi connection") between the printer 100 and the AP 6 and causes the printer 100 to execute communication to start the service of the server 500.

Figure 2:
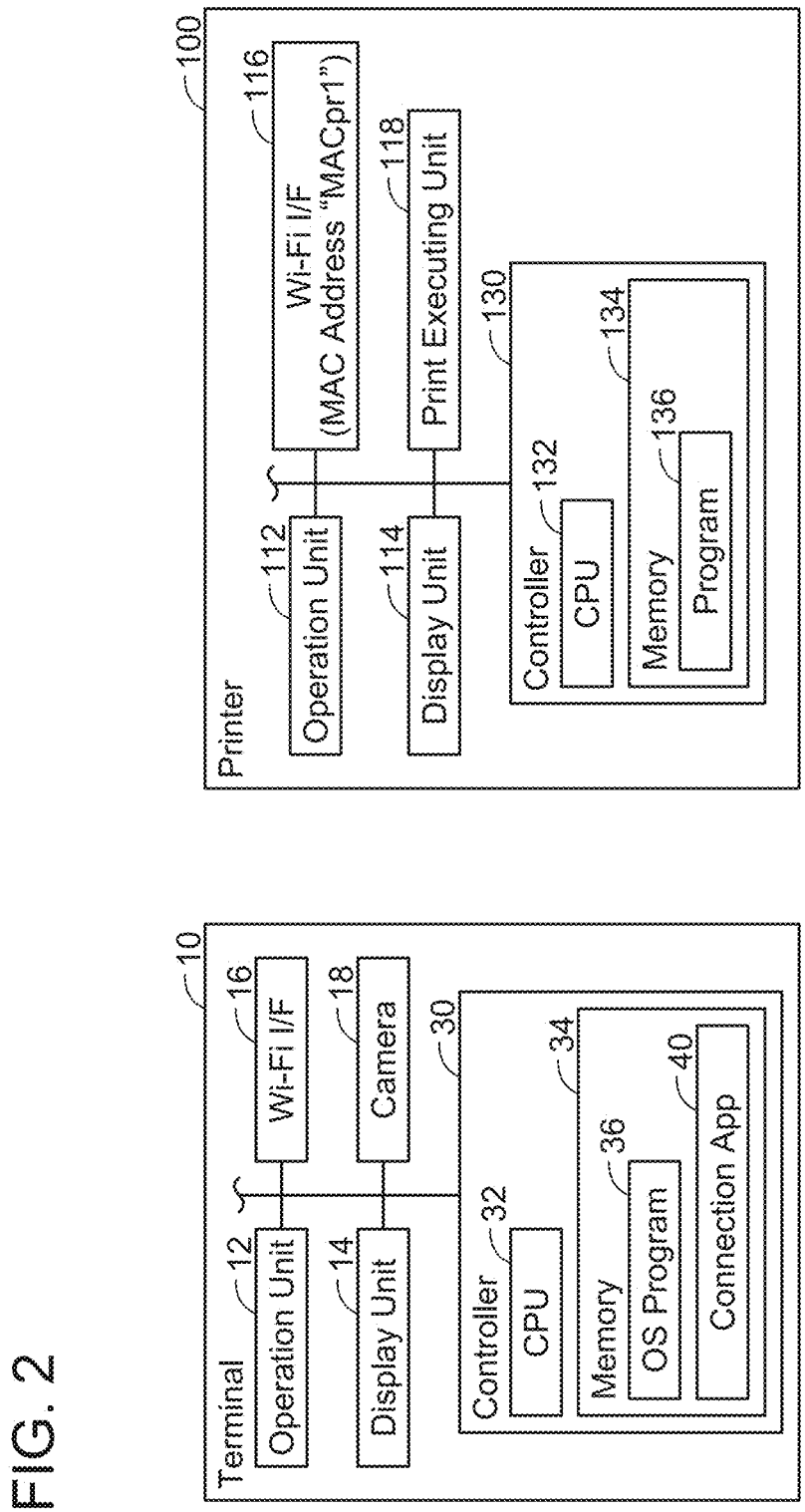
FIG. 2 shows hardware configurations of a terminal and a printer.

(Configuration of Terminal 10; FIG. 2)

The terminal 10 is a portable terminal device such as a cell phone (e.g., a smartphone), a PDA, a tablet PC, or the like. In a variant, the terminal 10 may be a stationary PC, a laptop PC, or the like. The terminal 10 includes an operation unit 12, a display unit 14, a Wi-Fi interface 16, a camera 18, and a controller 30. The units 12 to 30 are connected to a bus line (reference sign omitted). Hereinbelow, an interface will be abbreviated as "I/F". The camera 18 is a device configured to capture images of objects and is used especially to capture QR codes (registered trademark) for the AP 6 and the printer 100 in the present embodiment.

The operation unit 12 includes a plurality of keys. A user can input various instructions to the terminal 10 by operating the operation unit 12. The display unit 14 is a display configured to display various types of information. The display unit 14 may function as a touch screen (i.e., the operation unit 12).

The Wi-Fi I/F 16 is a wireless I/F configured to execute Wi-Fi communication according to a Wi-Fi standard. The Wi-Fi standard is a standard for executing wireless communication according to a standard of 802.11 established by the IEEE (The Institute of Electrical and Electronics Engineers, Inc.) and standards conforming thereto (e.g., 802.11a, 11b, 11g, 11n, etc.). The Wi-Fi I/F 16 supports a DPP (Device Provisioning Protocol) scheme established by the Wi-Fi Alliance. The DPP scheme is described in a specification "Device Provisioning Protocol Specification Version 1.1.13" created by the Wi-Fi Alliance.

The controller 30 includes a CPU 32 and a memory 34. The CPU 32 is configured to execute various processes according to programs 36 and 40 stored in the memory 34. The memory 34 is configured of a volatile memory, non-volatile memory, and the like. The OS (Operating System) program 36 executes basic control of the terminal 10. The connection application 40 (which will be simply called "connection app 40") is a program for establishing a Wi-Fi connection between the printer 100 and the AP 6. The connection app 40 is installed in the terminal 10, for example, from a server (not shown) on the Internet provided by the vendor of the printer 100.

(Configurations of Printers 100 and 200; FIG. 2)

Figure 1:
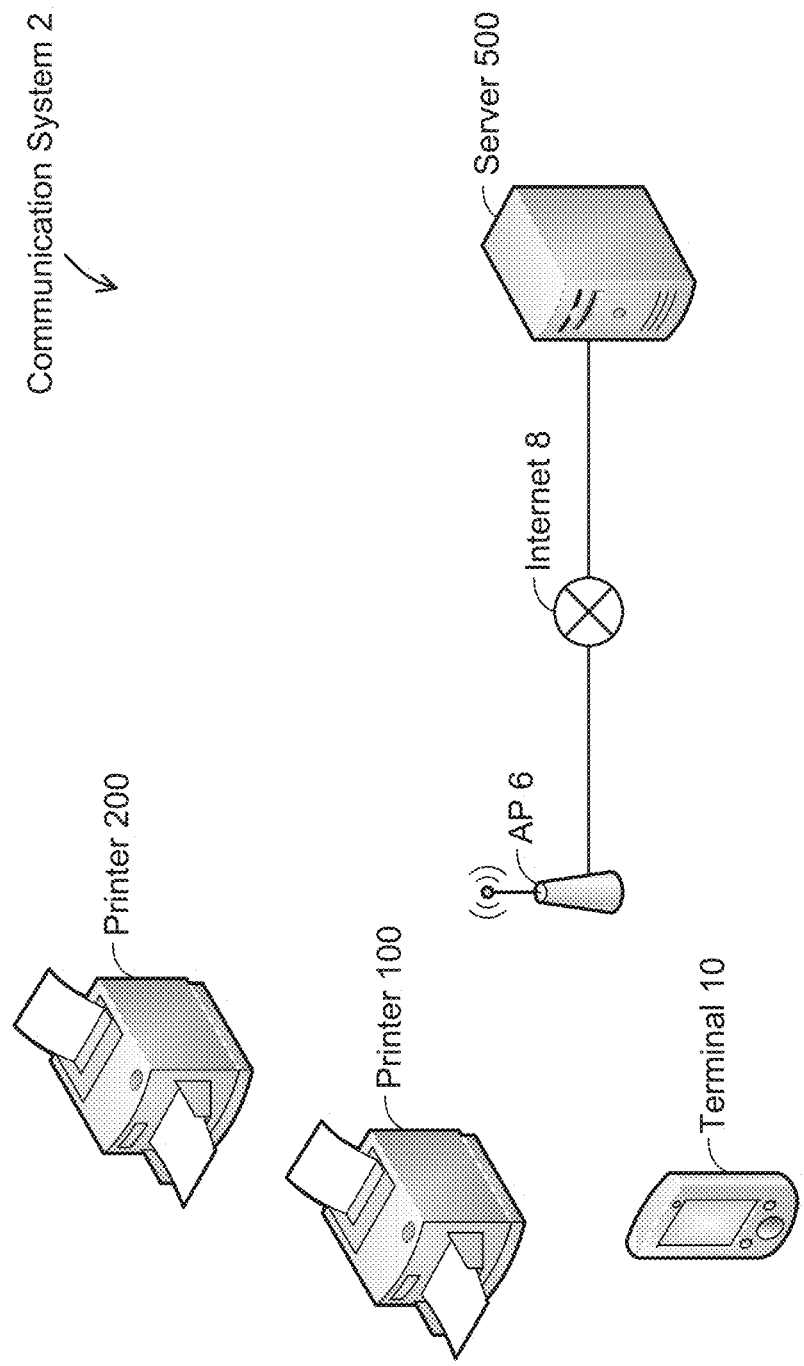
FIG. 1 shows an overview of an embodiment.

The printer 100 is a peripheral device (e.g., a peripheral device of the terminal 10) configured to execute a print function. In a variant, the printer 100 may be a multifunctional device configured to execute a scan function, a FAX function, and/or the like in addition to the print function. The printer 100 includes an operation unit 112, a display unit 114, a Wi-Fi I/F 116, a print executing unit 118, and a controller 130. The units 112 to 130 are connected to a bus line (reference sign omitted). The printer 200 (see FIG. 1) has the same configuration as the printer 100.

The operation unit 112 includes a plurality of keys. The user can input various instructions to the printer 100 by operating the operation unit 112. The display unit 114 is a display configured to display various types of information. The display unit 114 may function as a touch screen (i.e., the operation unit 112). The Wi-Fi I/F 116 is the same as the Wi-Fi I/F 16 of the terminal 10. That is, the Wi-Fi I/F 116 supports the DPP scheme. The Wi-Fi I/F 116 has a MAC address "MACpr1". The print executing unit 118 includes a print mechanism of inkjet scheme, laser scheme, or the like.

The controller 130 includes a CPU 132 and a memory 134. The CPU 132 is configured to execute various processes according to a program 136 stored in the memory 134. The memory 134 is configured of a volatile memory, a non-volatile memory, and the like.

(Setup for AP6; FIG. 3)

Referring to FIG. 3, a setup for the AP 6 will be described. By this setup, a Wi-Fi connection is established between the terminal 10 and the AP 6. It should be noted that every communication executed by the terminal 10 to be described hereinbelow is executed via the Wi-Fi I/F 16, and thus a phrase "via the Wi-Fi I/F 16" will be omitted in explanations for the communication hereinbelow. Further, to facilitate understanding, actions executed by the CPUs (e.g., the CPU 32, etc.) of the devices will be described with the devices (e.g., the terminal 10) as the subjects of action, instead of describing the CPUs as the subjects of action.

The AP 6 supports the DPP scheme. The AP 6 already stores in advance a public key "PPKap" used for communication according to the DPP scheme. Further, a QR code that is obtained by encoding the public key "PPKap" of the AP 6 and a MAC address "MACap" of the AP 6 has been attached to a housing of the AP 6.

When the terminal 10 receives a camera activation operation from the administrator of the office in T110, it activates the camera 18 and captures the QR code of the AP 6 in T112. Then, in T114, the terminal 10 decodes the captured QR code by using the connection app 40 and thereby obtains the public key "PPKap" and the MAC address "MACap". In other words, the processes of T112 and T114 are Bootstrapping (which will be abbreviated as "BS") of the DPP scheme between the terminal 10 and the AP 6. Every communication executed by the terminal 10 hereinbelow is executed by the connection app 40.

When the BS is completed, the terminal 10 executes Authentication (which will be abbreviated as "Auth") of the DPP scheme with the AP 6 in T120. Specifically, the terminal 10 first generates a shared key by using the public key "PPKap" and a private key of the terminal 10 (not shown) and then generates encrypted data by using the shared key. Then, the terminal 10 sends a Auth Request including the encrypted data and a public key of the terminal 10 (not shown) to the AP 6. This Request is a signal requesting the AP 6 to execute authentication and further includes information indicating that the terminal 10 is to operate as a Configurator. Hereinbelow, Request will be abbreviated as "Req".

When receiving the Auth Req from the terminal 10, the AP 6 executes authentication for the encrypted data included in the Auth Req. When the authentication is successful, the AP sends an Auth Response indicating the success to the terminal 10. This Response includes information indicating that the AP 6 is to be operate as an Enrollee. Hereinbelow, Response will be abbreviated as "Res". As a result of the Auth, the terminal 10 is determined to operate as a Configurator and the AP 6 is determined to operate as an Enrollee.

When sending the Auth Res to the terminal 10 (T120), the AP 6 executes Configuration (which will be abbreviated as "Config") of the DPP scheme with the terminal 10 in T130. Specifically, the AP 6, which is the Enrollee, sends a Config Req to the terminal 10, which is the Configurator. This Request is a signal requesting the terminal 10 to send a Configuration Object (which will be abbreviated as "CO") for AP. A CO for AP is information used by the AP 6 to establish a Wi-Fi connection between the terminal 10 and the AP 6.

When receiving the Config Req from the AP 6, the terminal 10 generates a CO for AP. This CO for AP includes a Signed-Connector (which will be abbreviated as "SC") for AP. Then, the terminal 10 sends a Config Res including the CO for AP to the AP 6.

When receiving the Config Res from the terminal 10 (T130), the AP 6 stores the CO for AP in a memory of the AP 6 (not shown) in T132.

Then, in T140, the terminal 10 executes Network Access of the DPP scheme with the AP 6. Specifically, the terminal 10 first generates a CO for terminal. This CO for terminal includes an SC for terminal. The terminal 10 obtains the SC for terminal included in the generated CO for terminal. Then, the terminal 10 sends a DPP Peer Discovery Req including the SC to the AP 6. This Req is a signal requesting the AP 6 to execute authentication. Hereinbelow, DPP Peer Discovery will be abbreviated as "Discovery".

When receiving the Discovery Req from the terminal 10, the AP 6 executes authentication by using the SC for terminal included in the Req. When the authentication is successful, the AP 6 generates a connection key and sends a Discovery Res including the SC for AP in the CO for AP to the terminal 10.

When receiving the Discovery Res from the AP 6, the terminal 10 executes authentication by using the SC for AP included in the Res. When the authentication is successful, the terminal 10 generates a connection key. This connection key is the same as the connection key generated by the AP 6. Thereby, the connection key is shared between the terminal 10 and the AP 6.

The terminal 10 executes 4way-handshake communication with the AP 6 using the connection key. As a result, in T142, a Wi-Fi connection is established between the terminal 10 and the AP 6. That is, the terminal 10 (i.e., the Wi-Fi I/F 16) is connected to the wireless LAN formed by the AP 6 (which will be termed "specific wireless LAN").

When the Wi-Fi connection is established with the terminal 10 in T142, the AP 6 sends a DPP Status Query Result (which will be abbreviated as "Result") of the DPP scheme to the terminal 10 in T150. This Result includes information indicating that the Wi-Fi connection has been established between the terminal 10 and the AP 6.

When receiving the Result from the AP 6 in T150, the terminal 10 attempts, in T160, to communicate with the server 500 on the Internet 8 using the Wi-Fi connection of T142. Specifically, in T160A, the terminal 10 sends the AP 6 a PING signal with the server 500 as its recipient.

(Case A1)

In Case A1, the attempt to communicate with the server 500 fails in response to the PING signal being sent in T160A. The attempt fails in a case where a response signal to the PING signal is not received by the terminal 10. Causes of the failure include, for example, that the AP 6 is not connected to the Internet 8, that the AP 6 is connected to the Internet 8 but the server 500 is disconnected from the Internet 8 because of maintenance for the server 500, that the AP 6 and the server 500 are connected to the Internet 8 but decode or authentication of the PING signal fails, and the like.

When the terminal 10 determines that it has not received the response signal to the PING signal of T160A, it causes the display unit 14 to display a setup screen SR1 in T162. The setup screen SR1 includes a message that it is impossible to communicate with the server 500, a "Cancel" button, and a "New" button. The "Cancel" button is for receiving input of an instruction to cancel a setup for the printer 100, which will be described later (FIG. 4). When the "Cancel" button is selected, the terminal 10 disconnects the Wi-Fi connection with the AP 6 and activates the camera 18 again to execute BS with another AP.

The "New" button is for receiving input of an instruction to execute the setup for a printer, which will be described later (FIG. 4). That is, the terminal 10 can receive the input of instruction to execute the setup for the printer even when it is impossible to communicate with the server 500. This configuration allows the user to proceed with the setup for the printer before the situation where it is impossible to communicate with the server 500 changes to the situation where it is possible to communicate with the server 500. User convenience is thereby improved.

(Case A2)

In Case A2, the attempt to communicate with the server 500 succeeds in response to the PING signal being sent in T160A. The attempt succeeds in a case where the terminal 10 receives the response signal to the PING signal. For example, when the AP 6 is connected to the Internet 8, the AP 6 sends the PING signal received from the terminal 10 to the server 500 in T160B. Then, in T164, the AP 6 receives the response signal to the PING signal from the server 500 and sends it to the terminal 10. As a result, the terminal 10 receives the response signal.

When the terminal 10 determines that it has received the response signal to the PING signal of T160A, it causes the display unit 14 to display a setup screen SR2 in T166. The setup screen SR2 includes a message that it is possible to communicate with the server 500 and a New button. The setup screen SR2 does not include the Cancel button. In other words, it is configured not to receive input of the instruction to cancel the setup for the printer 100, which will be described later (FIG. 4). This configuration prevents the setup for the printer 100 from being erroneously cancelled despite the attempt to communicate with the server 500 being successful in response to the PING signal being sent in T160A.

(Setup for Printers; FIGS. 4 to 8)

Referring to FIGS. 4 to 8, setup for one or more printers will be described. In the setup for one or more printers, a Wi-Fi connection can be established between the AP 6 and each of the one or more printers. FIGS. 4 to 6 describe a setup for the printer 100. FIG. 4 is the continuation from Case A2 (i.e., case where the attempt to communicate with the server 500 is successful) shown in FIG. 3. Further, FIG. 7 describes a setup for the printer 200 executed after the setup for the printer 100.

The printer 100 receives a turn-on operation from the administrator of the office in T200, and receives an operation of selecting a setting button for establishing a Wi-Fi connection between the printer 100 and the AP 6 in T202. In this case, the printer 100 causes the display unit 114 to display a QR code in T204. This QR code is a code image in which information including a public key "PPKpr1" stored in the printer 100 and the MAC address "MACpr1" is coded.

In T210, the terminal 10 receives an operation of selecting the "New" button in the setup screen SR2 of T166 in FIG. 3. T212 is the same as T112 in FIG. 3 except that the QR code of the printer 100 is captured. T214 is the same as T114 in FIG. 3 except that the public key "PPKpr1" and the MAC address "MACpr1" are obtained.

T220 is the same as T120 in FIG. 3 except that the Auth is executed with the printer 100. In T220, the terminal 10 is determined to operate as a Configurator and the printer 100 is determined to operate as an Enrollee.

T230 is the same as T130 in FIG. 3 except that a CO for first printer is sent from the terminal 10 to the printer 100. The CO for first printer is information used by the printer 100 to establish a Wi-Fi connection between the printer 100 and the AP 6. In other words, the CO for first printer is information for connecting the printer 100 to the specific wireless LAN of the AP 6. The CO for first printer includes a SC for first printer.

When the printer 100 receives a Config Res including the CO for first printer from the terminal 10 (T230), it stores the CO for first printer in the memory 134 in T232.

T240 is the same as T140 in FIG. 3 except that the Network Access is executed between the printer 100 and the AP 6 and the SC for first printer is used.

(Case B1)

In Case B1, the Network Access of T240 fails. Causes of the Network Access failure include, for example, that the printer 100 is located in an area where radio waves from the AP 6 cannot reach, that the authentication scheme of the printer 100 is different from that of the AP 6, and the like.

When the Network Access fails, the printer 100 sends in T250, to the terminal 10, a Result that includes information indicating the failure in establishment of a Wi-Fi connection between the printer 100 and the AP 6.

When receiving the Result from the printer 100 in T250, the terminal 10 causes the display unit 14 to display a setup screen SR3 in T252. The setup screen SR3 includes a status table ST, a "Registration" button, and a "New" button. The status table ST shows, for each of one or more printers, a setup status of the printer. The status table ST in the setup screen SR3 includes a message "connection failed" for the MAC address "MACpr1" of the printer 100, which indicates establishment of a Wi-Fi connection with the AP 6 failed.

The "Registration" button is for receiving input of a registration instruction. The registration instruction is an instruction to register a MAC address of a printer (e.g., the printer 100) in the server 500. Processes executed in response to the "Registration" button being selected will be described later referring to FIG. 8.

The "New" button in the setup screen SR3 is the same as the New button in the setup screen SR1 shown in FIG. 3. Processes executed in response to the "New" button in the setup screen SR3 being selected will be described later referring to FIG. 7.

(Case B2)

In Case B2, the Network Access of T240 succeeds. In T262, a Wi-Fi connection is established between the printer 100 and the AP 6. That is, the printer 100 (i.e., the Wi-Fi I/F 116) is connected to the specific wireless LAN of the AP 6.

When the Network Access succeeds, the printer 100 sends in T270, to the terminal 10, a Result that includes information indicating the success in establishment of the Wi-Fi connection between the printer 100 and the AP 6.

When receiving the Result from the printer 100 in T270, the terminal 10 causes the display unit 14 to display a setup screen SR4 in T272. The setup screen SR4 is the same as the setup screen SR3 except that the status table ST includes different contents. The status table ST in the setup screen SR4 includes a message "setup in progress" for the MAC address "MACpr1" of the printer 100, which indicates the setup for the printer 100 is in progress.

(Continuation of Case B2 in FIG. 4; FIG. 5)

When receiving the Result from the printer 100 in T270 of FIG. 4, the terminal 10 attempts to communicate with the printer 100 in T280A using the Wi-Fi connection of T142 in FIG. 3 and the Wi-Fi connection of T262 in FIG. 4 (i.e., using the specific wireless LAN of the AP 6). Specifically, the terminal 10 sends, to the AP 6, a PING signal with the printer 100 (i.e., the MAC address "MACpr1") as its recipient in T280A. In T280B, the AP 6 sends the PING signal to the printer 100 using the specific wireless LAN of the AP 6. The terminal 10 can thereby determine whether it is possible to communicate with the printer 100 using the specific wireless LAN of the AP 6.

(Case C1)

In Case C1, the attempt to communicate with the printer 100 fails in response to the PING signal being sent in T280A. The printer 100 does not send a response signal to the PING signal to the terminal 10, for example, when there is an error in network configuration of the printer 100. As a result, the attempt to communicate with the printer 100 fails in response to the PING signal being sent in T280A.

When the terminal 10 determines that it has not received the response signal to the PING signal of T280A, it causes the display unit 14 to display a setup screen SR5 in T282. The setup screen SR5 is the same as the setup screen SR3 shown in FIG. 4 except that the status table ST includes different contents. The status table ST in the setup screen SR5 includes a message "printer communication failed" for the MAC address "MACpr1" of the printer 100, which indicates it is impossible to communicate with the printer 100.

(Case C2)

In Case C2, the attempt to communicate with the printer 100 succeeds in response to the PING signal being sent in T280A. The attempt succeeds in a case where the response signal to the PING signal is received by the terminal 10. For example, when there are no errors in the network configuration of the printer 100, the printer 100 sends the response signal to the PING signal to the terminal 10 using the specific wireless LAN of the AP 6 in T284A and T284B. As a result, the terminal 10 receives the response signal. In the present case, the display of the setup screen SR4 shown in FIG. 4 is continued.

(Continuation of Case C2 in FIG. 5; FIG. 6)

When the terminal 10 receives the response signal from the printer 100 in T284B of FIG. 5, it sends a PING sending instruction to the printer 100 in T300A and T300B using the specific wireless LAN of the AP 6. The PING sending instruction is a request to cause the printer 100 to attempt to communicate with the server 500 using the specific wireless LAN of the AP 6. For example, a comparative example is assumed in which the PING sending instruction is sent to the printer 100 not by using the specific wireless LAN of the AP 6 but by using a P2P connection between the terminal 10 and the printer 100. This comparative example requires establishment of a P2P connection between the terminal 10 and the printer 100. To the contrary, the present embodiment does not require the establishment of such P2P connection since the specific wireless LAN can be used. This reduces processing loads on the terminal 10 and the printer 100. A type of the P2P connection is, for example, Wi-Fi Direct (registered trademark, WFD), SoftAP, or the like. In a variant, the configuration of the comparative example may be adopted.

When receiving the PING sending instruction from the terminal 10 in T300B, the printer 100 attempts to communicate with the server 500 on the Internet 8 in T302A using the specific wireless LAN of the AP 6. Specifically, the printer 100 sends the AP 6 a PING signal with the server 500 as its recipient in T302A.

(Case D1)

In Case D1, the attempt to communicate with the server 500 fails in response to the PING signal being sent in T302A. The attempt fails in a case where a response signal to the PING signal is not received by the printer 100. Causes of the failure include, for example, that the AP 6 is not connected to the Internet 8, that the AP 6 is connected to the Internet 8 but the server 500 is disconnected from the Internet 8 because of maintenance for the server 500, that the AP 6 and the server 500 are connected to the Internet 8 but decode or authentication of the PING signal fails, and the like.

When the printer 100 determines that it has not received the response signal to the PING signal of T302A, it sends the terminal 10 a no-response notification indicating that the response signal is not received in T304A and T304B using the specific wireless LAN of the AP6.

When receiving the no-response notification from the AP 6 in T304B, the terminal 10 causes the display unit 14 to display a setup screen SR6 in T306. The setup screen SR6 is the same as the setup screen SR3 shown in FIG. 4 except that the status table ST includes different contents. The status table ST in the setup screen SR6 includes a message "server communication failed" for the MAC address "MACpr1" of the printer 100, which indicates it is impossible to communicate with the server 500.

(Case D2)

In Case D2, the attempt to communicate with the server 500 succeeds in response to the PING signal being sent in T302A. The attempt succeeds in a case where the response signal to the PING signal is received by the printer 100. For example, when the AP 6 is connected to the Internet 8, the AP 6 sends the PING signal to the server 500 in T302B. Then, the AP 6 receives the response signal to the PING signal from the server 500 and sends it to the printer 100 in T308. As a result, the printer 100 receives the response signal.

When the printer 100 determines that it has received the response signal to the PING signal of T302A, it sends a response notification indicating that the response signal was received to the terminal 10 in T310A and T310B using the specific wireless LAN of the AP 6.

When receiving the response notification from the AP 6 in T310B, the terminal 10 causes the display unit 14 to display a setup screen SR7 in T312. The setup screen SR7 is the same as the setup screen SR3 shown in FIG. 4 except that the status table ST incudes different contents. The status table ST in the setup screen SR7 includes a message "setup completed" for the MAC address "MACpr1" of the printer 100, which indicates the setup of the printer 100 has been completed.

(Setup for Second Printer with Access Point; FIG. 7)

FIG. 7 shows the continuation of Case B1 in FIG. 4 (i.e., the case where the establishment of a Wi-Fi connection between the printer 100 and the AP 6 fails). In the present embodiment, even when the setup for the printer 100 fails, a setup for another printer 200 can be executed. The user can start the setup for the other printer 200 without waiting for the completion of the setup for the printer 100, and thereby user convenience is improved.

In T410, the terminal 10 receives an operation of selecting the "New" button in the setup screen SR3 of T252 in FIG. 4. Thereby, BS is executed as in T212 and T214 of FIG. 4. In this BS, a public key "PPKpr2" of the printer 200 and a MAC address "MACpr2" of the printer 200 are obtained.

T420 is the same as T220 in FIG. 4 except that the Auth is executed with the printer 200. T430 is the same as T230 in FIG. 4 except that a CO for second printer is sent from the terminal 10 to the printer 200. The CO for second printer is information used by the printer 200 to establish a Wi-Fi connection between the printer 200 and the AP 6. In other words, the CO for second printer is information for connecting the printer 200 to the specific wireless LAN of the AP 6. The CO for second printer includes an SC for second printer. T432 is the same as T232 in FIG. 4 except that the CO for second printer is stored in the memory 134.

T440 is the same as T240 in FIG. 4 except that the Network Access is executed between the printer 200 and the AP 6 and the SC for second printer is used. In T442, a Wi-Fi connection is established between the printer 200 and the AP 6.

T450 is the same as T270 in FIG. 4 except that the printer 200 sends the Result. T472 is the same as T272 in FIG. 4 except that a setup screen SR14 is displayed. The setup screen SR14 is the same as the setup screen SR4 except that the status table ST includes different contents. The setup screen SR14 includes the message "connection failed" for the MAC address "MACpr1" of the printer 100 and further includes the message "setup in progress" for the MAC address "MACpr2" of the printer 200.

T480A to T484B are the same as T280A to T284B in FIG. 5. At the time when the response signal is received in T484B, the display of the setup screen SR14 is still continuing.

T500A to T510B are the same as T300A to T302B, T308, T310A, and T310B in FIG. 6 except that the printer 200 sends the PING signal and the response notification. T512 is the same as T312 in FIG. 6 except that a setup screen SR17 is displayed. The setup screen SR17 includes the message "connection failed" for the MAC address "MACpr1" of the printer 100 and further includes the message "setup completed" for the MAC address "MACpr2" of the printer 200.

(Registration to Server 500; FIG. 8)

Referring to FIG. 8, a process of registering the MAC address "MACpr2" of the printer 200 to the server 500 after the setup for the printers 100 and 200 will be described. FIG. 8 shows the continuation of FIG. 7.

When the terminal 10 receives in T600 an operation of selecting the "Registration" button in the setup screen SR17 of T512 in FIG. 7, it causes the display unit 14 to display a login screen SR20. The login screen SR20 is for input of account information (i.e., an account name and a password) used for login authentication. Account information AI of the user of the terminal 10 (i.e., the administrator) has been stored in advance in the server 500.

When receiving input of the account information AI in the login screen SR20 in T602, the terminal 10 sends a login request including the account information AI to the server 500 in T604.

When receiving the login request from the terminal 10 in T604, the server 500 executes authentication for the account information AI included in the login request in T606. In the present case, the authentication for the account information AI succeeds. In T608, the server 500 sends a success notification indicating the success of authentication for the account information AI to the terminal 10.

When receiving the success notification from the server 500 in T608, the terminal 10 sends a PIN (Personal Identification Number) request that requests generation of a PIN code to the server 500 in T610. A PIN code is used in authentication for registering the MAC address "MACpr2" of the printer 200 to the server 500.

When receiving the PIN request from the terminal 10 in T610, the server 500 generates a PIN code "1234" in T612. The server 500 stores, in a memory of the server 500 (not shown), the PIN code "1234" in association with the logged-in account information AI.

In T614, the server 500 sends the PIN code "1234" generated in T612 to the terminal 10.

When receiving the PIN code "1234" from the server 500 in T614, the terminal 10 sends the PIN code "1234" to the printer 200 in T620A and T620B using the specific wireless LAN of the AP 6. This configuration reduces workload on the user, compared to a comparative example in which the user inputs the PIN code "1234" to the printer 200 by operating the operation unit of the printer 200 (not shown). In a variant, the configuration of this comparative example may be adopted.

The processes of T602 to T620A are executed using the terminal 10 used in the setup for the printer 200 (i.e., Configurator of the DPP scheme). The user can perform the registration to the server 500 without using another terminal different from the terminal 10 used in the setup for the printer 200. User convenience is thereby improved.

For example, a comparative example is assumed in which the PIN code "1234" is sent to the printer 200 using another communication pathway different from the specific wireless LAN of the AP 6. The other communication pathway may, for example, be a wireless LAN formed by a different AP than the AP 6, a P2P connection between the terminal 10 and the printer 200, or the like. A P2P connection is a connection according to, for example, WFD, SoftAP, Bluetooth (registered trademark), NFC (Near Field Communication), or the like. In the present embodiment, however, such another communication pathway is not necessary since the specific wireless LAN established in the setup for the printer 200 can be used. Since processes to connect the terminal 10 and the printer 200 to another communication pathway are not executed or there is no need to maintain another communication pathway, processing loads on the terminal 10 and the printer 200 can be reduced. In a variant, the configuration of this comparative example may be adopted.

When the printer 200 receives the PIN code "1234" from the terminal 10 in T620B, it sends the server 500 a registration request for registering the MAC address "MACpr2" of the printer 200 to the server 500 in T622 using the specific wireless LAN of the AP 6. The registration request includes the MAC address "MACpr2" and the PIN code "1234". According to this configuration, the registration of the MAC address "MACpr2" of the printer 200 can be executed following the setup for the printer 200 by selecting the Registration button in the setup screen SR17. Thus, user convenience is improved.

When the server 500 receives the registration request from the printer 200 in T622, it executes authentication for the PIN code "1234" included in the registration request in T624. In the present case, this authentication succeeds since the PIN code "1234" has already stored in the memory of the server 500 (not shown). Then, the server 500 identifies the account information AI stored in association with the PIN code "1234" in the memory of the server 500 and stores the MAC address "MACpr2" included in the registration request in association with the identified account information AI in the memory of the server 500. Thereby, the registration of the MAC address "MACpr2" of the printer 200 to the server 500 is completed and the user can receive the service provided by the server 500.

Effects of Present Embodiment

According to the configuration of the present embodiment, when the Wi-Fi connection with the AP 6 is established, the terminal 10 attempts to communicate with the server 500 by sending the AP 6 the PING signal with the server 500 as its recipient using the specific wireless LAN of the AP 6 (T160A in FIG. 3). In the case where the attempt is successful (Case A2 in FIG. 3), the terminal 10 executes the setup for the printer 100 and sends the CO for first printer to the printer 100 (T230 in FIG. 4). The printer 100 can be thereby connected to the specific wireless LAN of the AP 6 (i.e., a wireless LAN through which communication with the server 500 can be executed), and as a result, the printer 100 can communicate with the server 500 on the Internet 8.

Further, the terminal 10 sends the PING sending instruction to the printer 100 (T300A in FIG. 6) after having sent the CO for first printer to the printer 100. Thus, the printer 100 attempts to communicate with the server 500 using the specific wireless LAN of the AP 6 (T302A in FIG. 6) and sends a notification indicating the attempt result (i.e., the no-response notification or the response notification) to the terminal 10. As a result, the terminal 10 displays a setup screen (i.e., SR6 or SR7) including a message corresponding to the notification (i.e., "server communication failed" or "setup completed"). By looking at the setup screen, the user can understand whether the attempt of the printer 100 to communicate with the server 500 on the Internet 8 using the specific wireless LAN succeeded or not. Thus, in the case where the attempt of the printer 100 to communicate with the server 500 using the specific wireless LAN failed, the user can work to connect the printer 100 to, for example, another wireless LAN that is different from the specific wireless LAN and is communicable with the server 500 on the Internet 8. As a result, the printer 100 can communicate with the server 500 on the Internet 8.

A comparative example is assumed in which the printer 100 causes the display unit 114 to display a message corresponding to the no-response notification of T304A or the response notification of T310A. In this comparative example, the user has to approach the printer 100 to read the message. To the contrary, in the present embodiment, the user can read the message on the setup screen SR6 or SR7 displayed in the terminal 10. Thus, user convenience is improved.

In the present embodiment, the terminal 10 displays the setup screens including different messages in various cases. Specifically, the setup screen SR5 includes the message "printer communication failed" (T282 in FIG. 5) in Case C1 where the terminal 10 cannot communicate with the printer 100 using the specific wireless LAN of the AP 6. The setup screen SR6 includes the message "server communication failed" (T306 in FIG. 6) in Case D1 where the printer 100 cannot communicate with the server 500 using the specific wireless LAN of the AP 6. The setup screen SR7 includes the message "setup completed" (T312 in FIG. 6) in Case D2 where the printer 100 can communicate with the server 500 using the specific wireless LAN of the AP 6. This configuration allows the user to know whether it is possible to communicate with the server 500 or not and the reason why it is impossible to communicate with the server 500.

(Correspondence Relationships)

The terminal 10, the connection app 40, and the CPU 32 are examples of "terminal device", "computer-readable instructions", and "processor", respectively. The display unit 14 is an example of "output unit (and predetermined output unit)". The Wi-Fi I/F 16 is an example of "communication interface" of the "terminal device". The printer 100 is an example of "communication device". The Wi-Fi I/F 116 is an example of "communication interface (and output unit)" of the "communication device". The AP 6 and the specific wireless LAN are examples of "access point" and "specific LAN", respectively. The process of T160A in FIG. 3 is an example of "first attempt process". The Cancel button in the setup screen SR1 shown in FIG. 3 being selected is an example of "a specific condition is fulfilled". The setup screen SR1 shown in FIG. 3, the New button in the screen SR1, and selection of the New button are examples of "first screen", "first button", and "first instruction", respectively. The Cancel button in the setup screen SR1 shown in FIG. 3 and selection of the Cancel button are examples of "second button" and "second instruction", respectively. The setup screen SR2 shown in FIG. 3 and the New button in the screen SR2 are examples of "second screen" and "third button", respectively. The QR code shown in FIG. 4, and the Auth Req and Auth Res of T220 in FIG. 4 are examples of "specific information", "authentication request", and "authentication response", respectively. The CO for first printer is an example of "connection information". The process of T280A in FIG. 5, the PING signal of T280B, and the response signal of T284A are examples of "second attempt process", "predetermined signal", and "response signal", respectively. The setup screen SR5 shown in FIG. 5, and the setup screen SR6 and the setup screen SR7 shown in FIG. 6 are examples of "third screen", "fourth screen", and "fifth screen", respectively. The no-response notification of T304B or the response notification of T310B in FIG. 6 is an example of "result information". The PIN code "1234" of T620A and the registration request of T622 in FIG. 8 are examples of "registration signal" and "registration request", respectively.

T160 in FIG. 3, T230 in FIG. 4, and T300A in FIG. 6 are examples of "execute a first attempt process", "send connection information", and "send an attempt request", respectively.

T230 in FIG. 4, T240 in FIG. 4, T300A and T302A in FIG. 6 are examples of "receive connection information", "connect the communication interface to the specific LAN", "receive an attempt request", and "attempt to communicate with the server", respectively. T304A or T310A in FIG. 6 is an example of "cause an output unit of the communication device to output result information"

(Variant 1) In the above embodiment, the terminal 10 sends the PING signal to the AP 6 using the specific wireless LAN of the AP 6 (T160A in FIG. 3). Instead of this, the terminal 10 may send the PING signal to the AP 6 using a wired LAN with the AP 6. In the present variant, a LAN including the wired LAN and the specific wireless LAN of the AP 6 is an example of the "specific LAN". Further, an I/F configured to execute communication using the wired LAN is an example of the "communication interface" of the "terminal device".

(Variant 2) In the above embodiment, the terminal 10 sends the CO for first printer to the printer 100 via the Wi-Fi I/F 16 (T230 in FIG. 4). Instead of this, the terminal 10 may send the CO for first printer to the printer 100 using a wired LAN with the AP 6. Further, in the present variant, the Auth of T220 and the Result of T250 are also executed using the wired LAN. Further, in the present variant, the PING sending instruction of T300A in FIG. 6 may be sent to the printer 100 using the wired LAN. In the present variant, an I/F configured to execute communication using the wired LAN is an example of the "communication interface" of the "terminal device".

(Variant 3) The "communication device" is not limited to the printer 100. It may, for example, be a scanner, a multifunctional device, a facsimile apparatus, a PC, or the like.

(Variant 4) The "first instruction" is not limited to the selection of the "New" button in the setup screen SR1 shown in FIG. 3. It may, for example, be selection of a specific button (e.g., a button different from the touch screen) on the operation unit 12 of the terminal 10, an audio instruction, or the like.

(Variant 5) The setup screen SR1 shown in FIG. 3 may not include the "New" button. Further, in the case where the attempt to communicate with the server 500 fails in response to the PING signal being sent in T160A, the terminal 10 may not execute the processes of FIG. 4 and thereafter. In the present variant, the "first instruction" may be omitted.

(Variant 6) The "second instruction" is not limited to the selection of the "Cancel" button in the setup screen SR1 shown in FIG. 3. It may, for example, be selection of a specific button (e.g., a button different from the touch screen) on the operation unit 12 of the terminal 10, an audio instruction, or the like.

(Variant 7) The setup screen SR2 shown in FIG. 3 may include a "Cancel" button. Generally speaking, the terminal device may be configured to receive the second instruction in the case where the attempt to communicate with the server is successful in the first attempt process.

(Variant 8) In the above embodiment, the setup screens SR1 and SR2 shown in FIG. 3 include the same "New" button. Instead of this, one of the setup screens SR1 and SR2 shown in FIG. 3 may include another button that is different from the "New" button and is used for receiving an instruction for printer setup. In the present variant, the other button is an example of the "third button".

(Variant 9) The "predetermined output unit" is not limited to the display unit 14 of the terminal 10. It may, for example, be a microphone, a light, an I/F configured to execute communication with another device (e.g., an I/F for sending an e-mail), or the like of the terminal 10. Also, the "predetermined output unit" may, for example, be the display unit 114 of the printer 100 or the like. In the present variant, causing the display unit 114 to display the result of attempt to communicate with the server 500 in response to the PING signal being sent in T302A in FIG. 6 is an example of "cause an output unit of the communication device to output result information".

(Variant 10) The process of T300A in FIG. 6 may not be executed. In the present variant, the "attempt request" may be omitted. In other words, the "terminal device" may be caused only to "execute a first attempt process" and "send connection information".

(Variant 11) The process of T160A in FIG. 3 may not be executed. In the present variant, the "first attempt process" may be omitted. In other words, the "terminal device" may be caused only to "send connection information" and "send an attempt request".

(Variant 12) The "attempt request" may be sent to the communication device using a different communication pathway than the "specific LAN". The different communication pathway may, for example, be a P2P connection according to WFD or the like.

(Variant 13) The setup screens shown in FIGS. 4 to 8 may not include the status tables ST. In the present variant, the "third screen", the "fourth screen", and the "fifth screen" may be omitted.

(Variant 14) The process of T280A in FIG. 5 may not be executed. In the present variant, the "second attempt process", the "predetermined signal", and the "response signal" may be omitted.

(Variant 15) The printer 100 may execute one of processes of variants 15-1 and 15-2 described below in T204 of FIG. 4, instead of displaying the QR code.

(Variant 15-1) The printer 100 may cause the print executing unit 118 to print the QR code. In this case, the terminal 10 obtains information such as the public key "PPKpr1" and the like by capturing the printed QR code. In the present variant, the QR code being printed is an example of "specific information is outputted by the communication device" and the print executing unit 118 is an example of the "output unit" of the "communication device".

(Variant 15-2) The printer 100 may establish a P2P connection (e.g., a connection according to the WFD scheme, Bluetooth scheme, or NFC scheme) with the terminal 10. In this case, the printer 100 may send information such as the public key "PPKpr1" and the like to the terminal 10 using the established P2P connection. In the present variant, the information such as the public key "PPKpr1" and the like being sent is an example of "specific information is outputted by the communication device" and an I/F configured to execute wireless communication using the P2P connection (e.g., a connection according to the WFD scheme, Bluetooth scheme, or NFC scheme) is an example of the "output unit" of the "communication device".

(Variant 16) In the above embodiment, the DPP processes (Auth, etc.) are executed, and thereby the CO for first printer is sent to the printer 100. Instead of this, a wireless profile (i.e., an SSID and a password) of the AP 6 may be sent from the terminal 10 to the printer 100, without executing the DPP processes. In the present variant, the wireless profile is an example of "connection information", and the "public key", the "authentication request", and "authentication response" may be omitted.

(Variant 17) The "registration signal" is not limited to a signal including a PIN code. It may, for example, be a signal that includes a command instructing sending of a registration request and does not include a PIN code.

(Variant 18) The process of FIG. 8 may not be executed. In the present variant, the "registration signal" and the "registration request" may be omitted.

(Variant 19) In the above embodiment, the processes of FIGS. 3 to 8 are implemented by software (e.g., the connection app 40), however, at least one of those processes may be implemented by hardware such as a logic circuit.

What is claimed is:

1. A non-transitory computer-readable medium storing computer-readable instructions for a terminal device, wherein
the terminal device comprises:
a communication interface configured to execute communication using a Local Area Network (LAN); and
a processor,
wherein the computer-readable instructions, when executed by the processor, cause the terminal device to:
execute a first attempt process in which the terminal device attempts to communicate with a server on the Internet via the communication interface by using a specific LAN to which the terminal device is currently connected; and
in a case where the attempt to communicate with the server is successful in the first attempt process, send connection information to a communication device different from the terminal device, the connection information being for connecting the communication device to the specific LAN, wherein in a case where a specific condition is fulfilled, the connection information is not sent to the communication device, the specific condition including a condition that the attempt to communicate with the server fails in the first attempt process.

2. The non-transitory computer-readable medium as in claim 1, wherein
the connection information is sent to the communication device in a case where the attempt to communicate with the server fails in the first attempt process and a first instruction is inputted, and
the specific condition includes a condition that the attempt to communicate with the server fails in the first attempt process and the first instruction is not inputted.

3. The non-transitory computer-readable medium as in claim 2, wherein
the terminal device further comprises a display unit, and
the computer-readable instructions, when executed by the processor, further cause the terminal device to:
in a case where the attempt to communicate with the server fails in the first attempt process, cause the display unit to display a first screen including a first button for receiving input of the first instruction.

4. The non-transitory computer-readable medium as in claim 2, wherein
the specific condition includes a condition that the attempt to communicate with the server fails in the first attempt process, the first instruction is not inputted, and a second instruction different from the first instruction is inputted, and
the terminal device is configured not to receive the second instruction in the case where the attempt to communicate with the server is successful in the first attempt process.

5. The non-transitory computer-readable medium as in claim 4, wherein
the terminal device further comprises a display unit, and
the computer-readable instructions, when executed by the processor, further cause the terminal device to:
in a case where the attempt to communicate with the server fails in the first attempt process, cause the display unit to display a first screen including a first button for receiving input of the first instruction and a second button for receiving input of the second instruction; and in the case where the attempt to communicate with the server is successful in the first attempt process, cause the display unit to display a second screen that includes a third button for receiving an instruction to send the connection information to the communication device and does not include the second button.

6. The non-transitory computer-readable medium as in claim 1, wherein the computer-readable instructions, when executed by the processor, further cause the terminal device to:

after the connection information has been sent to the communication device, send an attempt request to the communication device, the attempt request being for causing the communication device to attempt to communicate with the server by using the specific LAN, wherein an attempt result in response to the attempt request is outputted by a predetermined output unit.

7. The non-transitory computer-readable medium as in claim 1, wherein the computer-readable instructions, when executed by the processor, further cause the terminal device to:

after the connection information has been sent to the communication device, execute a second attempt process in which the terminal device attempts to communicate with the communication device via the communication interface by using the specific LAN.

8. The non-transitory computer-readable medium as in claim 1, wherein the communication interface is an interface configured to execute communication using a wireless LAN, and the specific LAN is a wireless LAN formed by an access point.

9. The non-transitory computer-readable medium as in claim 1, wherein the computer-readable instructions, when executed by the processor, further cause the terminal device to:

in a case where specific information obtained by using a public key of the communication device is outputted by the communication device, obtain the public key;

send an authentication request in which the obtained public key is used to the communication device; and receive an authentication response from the communication device in response to the authentication request being sent to the communication device, and the connection information is sent to the communication device after the authentication response has been received from the communication device.

10. The non-transitory computer-readable medium as in claim 1, wherein the computer-readable instructions, when executed by the processor, further cause the terminal device to:

after the connection information has been sent to the communication device, send a registration signal to the communication device, the registration signal being for registering identification information of the communication device in the server.

11. A non-transitory computer-readable medium storing computer-readable instructions for a terminal device, wherein the terminal device comprises:

a communication interface configured to execute communication using a Local Area Network (LAN); and a processor, wherein the computer-readable instructions, when executed by the processor, cause the terminal device to:

send connection information to a communication device different from the terminal device via the communication interface, the connection information being for connecting the communication device to a specific LAN to which the terminal device is currently connected; and after the connection information has been sent to the communication device, send an attempt request to the communication device via the communication interface, the attempt request being for causing the communication device to attempt to communicate with a server on the Internet by using the specific LAN, wherein an attempt result in response to the attempt request is outputted by a predetermined output unit.

12. The non-transitory computer-readable medium as in claim 11, wherein the attempt request is sent to the communication device after the connection information has been sent to the communication device and the communication device has connected to the specific LAN.

13. The non-transitory computer-readable medium as in claim 11, wherein the terminal device further comprises the predetermined output unit, and the computer-readable instructions, when executed by the processor, further cause the terminal device to:

in response to the attempt request being sent to the communication device, receive result information indicating the attempt result from the communication device via the communication interface; and cause the predetermined output unit to output the attempt result indicated by the received result information.

14. The non-transitory computer-readable medium as in claim 13, wherein the predetermined output unit is a display unit, the computer-readable instructions, when executed by the processor, further cause the terminal device to:

after the connection information has been sent to the communication device, execute a second attempt process in which the terminal device attempts to communicate with the communication device via the communication interface by using the specific LAN; and in a case where the attempt to communicate with the communication device fails in the second attempt process, cause the display unit to display a third screen, the display unit is caused to display a fourth screen in a case where the attempt to communicate with the communication device is successful in the second attempt process and the result information indicating a failure of the attempt to communicate with the server is received from the communication device, the display unit is caused to display a fifth screen in a case where the attempt to communicate with the communication device is successful in the second attempt process and the result information indicating success of the attempt to communicate with the server is received from the communication device, and the third screen, the fourth screen, and the fifth screen include messages different from each other.

15. The non-transitory computer-readable medium as in claim 11, wherein
the computer-readable instructions, when executed by the processor, further cause the terminal device to:
after the connection information has been sent to the communication device, execute a second attempt process in which the terminal device attempts to communicate with the communication device via the communication interface by using the specific LAN.

16. The non-transitory computer-readable medium as in claim 11, wherein
the communication interface is an interface configured to execute communication using a wireless LAN, and
the specific LAN is a wireless LAN formed by an access point.

17. The non-transitory computer-readable medium as in claim 11, wherein
the computer-readable instructions, when executed by the processor, further cause the terminal device to:
in a case where specific information obtained by using a public key of the communication device is outputted by the communication device, obtain the public key;
send an authentication request in which the obtained public key is used to the communication device; and
receive an authentication response from the communication device in response to the authentication request being sent to the communication device, and
the connection information is sent to the communication device after the authentication response has been received from the communication device.

18. The non-transitory computer-readable medium as in claim 11, wherein
the computer-readable instructions, when executed by the processor, further cause the terminal device to:
after the connection information has been sent to the communication device, send a registration signal to the communication device, the registration signal being for registering identification information of the communication device in the server.

19. A communication device comprising;
a communication interface configured to execute communication using a Local Area Network (LAN);
a processor; and
a memory storing computer-readable instructions therein, wherein the computer-readable instructions, when executed by the processor, cause the communication device to:
receive connection information from a terminal device different from the communication device via the communication interface, the connection information being for connecting the communication device to a specific LAN to which the terminal device is currently connected;
connect the communication interface to the specific LAN by using the received connection information;
after the connection information has been received from the terminal device, receive an attempt request from the terminal device via the communication interface, the attempt request being for causing the communication device to attempt to communicate with a server on the Internet by using the specific LAN;
after the attempt request has been received from the terminal device, attempt to communicate with the server via the communication interface by using the specific LAN; and
cause an output unit of the communication device to output result information indicating an attempt result in response to the attempt request.

20. The communication device as in claim 19, wherein
the output unit is the communication interface, and
the result information is outputted by sending the result information to the terminal device via the communication interface.

21. The communication device as in claim 19, wherein
the attempt request is received from the terminal device via the communication interface by using the specific LAN after the communication device has connected to the specific LAN.

22. The communication device as in claim 19, wherein
the computer-readable instructions, when executed by the processor, further cause the communication device to:
after the connection information has been received from the terminal device, receive a predetermined signal from the terminal device via the communication interface by using the specific LAN; and
send a response signal to the terminal device via the communication interface by using the specific LAN in response to the predetermined signal being received from the terminal device.

23. The communication device as in claim 19, wherein
the communication interface is an interface configured to execute communication using a wireless LAN, and
the specific LAN is a wireless LAN formed by an access point.

24. The communication device as in claim 19, wherein
the computer-readable instructions, when executed by the processor, further cause the communication device to:
cause the output unit to output specific information obtained by using a public key;
after the specific information has been outputted, receive an authentication request in which the public key is used from the terminal device via the communication interface; and
send an authentication response to the terminal device via the communication interface in response to the authentication request being received from the terminal device, and
the connection information is received from the terminal device after the authentication response has been sent to the terminal device.

25. The communication device as in claim 19, wherein
the computer-readable instructions, when executed by the processor, further cause the communication device to:
in a case where the attempt to communicate with the server is successful, send a registration request to the server via the communication interface by using the specific LAN, the registration request being for registering identification information of the communication device in the server.

* * * * *